(12) United States Patent
Nishiyama et al.

(10) Patent No.: US 8,789,636 B2
(45) Date of Patent: Jul. 29, 2014

(54) BATTERY-POWERED FORKLIFT

(75) Inventors: Kouji Nishiyama, Oyama (JP);
Kazuhiro Kurihara, Moka (JP);
Tetsuya Okuyama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/816,415

(22) PCT Filed: Mar. 13, 2012

(86) PCT No.: PCT/JP2012/056446
§ 371 (c)(1),
(2), (4) Date: Feb. 11, 2013

(87) PCT Pub. No.: WO2012/137582
PCT Pub. Date: Oct. 11, 2012

(65) Prior Publication Data
US 2014/0020967 A1    Jan. 23, 2014

(30) Foreign Application Priority Data

Apr. 8, 2011    (JP) .................................. 2011-086787

(51) Int. Cl.
*B60R 16/04*    (2006.01)

(52) U.S. Cl.
USPC ...................................................... 180/68.5

(58) Field of Classification Search
USPC ......................................... 180/68.5; 903/907
See application file for complete search history.

(56) References Cited

U.S. PATENT DOCUMENTS

| | | |
|---|---|---|
| 4,026,378 A | 5/1977 | DePriester |
| 2009/0283346 A1* | 11/2009 | Katae et al. ................. 180/68.2 |

FOREIGN PATENT DOCUMENTS

| | | |
|---|---|---|
| DE | 102008004653 A1 | 4/2009 |
| GB | 2454067 A | 4/2009 |
| JP | 50-27103 U | 7/1973 |
| JP | 58-1089 U | 6/1981 |
| JP | 2001-302192 A | 10/2001 |
| JP | 2001-316091 A | 11/2001 |
| JP | 2002-308582 A | 10/2002 |
| JP | 2003-002592 A | 1/2003 |
| JP | 3838419 A | 3/2003 |
| JP | 2003-118990 A | 4/2003 |
| JP | 2005-041656 A | 2/2005 |

OTHER PUBLICATIONS

Decision of a Patent Grant mailed Dec. 4, 2012, issued for the corresponding Japanese patent application No. 2012-548264 and English translation thereof.
International Search Report dated Jun. 26, 2012, issued for PCT/JP2012/056446.
Office Action dated Nov. 14, 2013 issued for corresponding German patent application No. 112012000063.3.

* cited by examiner

*Primary Examiner* — John Walters
*Assistant Examiner* — James Triggs
(74) *Attorney, Agent, or Firm* — Edwards Wildman Palmer LLP

(57) ABSTRACT

A battery-powered forklift including a fork placed at an anterior portion of a vehicle body, and a counter weight placed at a posterior portion of the vehicle body, the battery-powered forklift running by electric power of a battery mounted on the vehicle body, wherein a concave portion that is open in a longitudinal direction is formed at an upper surface of the counter weight, the battery is mounted on a position above a rear wheel of the vehicle body while at least a part of the battery overlaps with the counter weight, and the battery is removable toward a rear of the vehicle body through the concave portion of the counter weight.

9 Claims, 9 Drawing Sheets

BATTERY-POWERED FORKLIFT

FIELD

The present invention relates to a battery-powered forklift that runs on a battery mounted on a vehicle body.

BACKGROUND

Some of forklifts that load, unload, and move a burden using a fork placed at the anterior portion of the vehicle body run on a battery mounted on the vehicle body. This kind of battery-powered forklift has an advantage in an interior cargo handling operation because the battery-powered forklift does not have a problem of noises or exhaust gases in comparison with the forklift running by an engine. However, the battery-powered forklift cannot continuously be used by refilling fuel as a forklift running by an engine. It is necessary to replace the battery with a fully charged battery when the electric charge of the battery has decreased. The battery is generally loaded or unloaded from the side of the vehicle body of the forklift because a counter weight is provided at the posterior portion of the vehicle body (for example, see Patent Literature 1).

CITATION LIST

Patent Literature

Patent Literature 1: Japanese Laid-open Patent Publication No. 2002-308582

SUMMARY

Technical Problem

By the way, a larger battery is required to sufficiently secure the operating time of the forklift. However, parts that form the vehicle body such as rear stays are placed at the posterior portion of the forklift. Accordingly, when a large battery is mounted, it is necessary to load or unload the battery from the side of the vehicle body while avoiding the interference with the vehicle body component parts such as rear stays. This significantly complicates the operation.

In light of the foregoing, an objective of the present invention is to provide a battery-powered forklift capable of facilitating the operation when the battery is loaded or unloaded even if a large battery is mounted.

Solution to Problem

To achieve the object mentioned above, according to the present invention, a battery-powered forklift comprises a fork placed at an anterior portion of a vehicle body, and a counter weight placed at a posterior portion of the vehicle body, the battery-powered forklift running by electric power of a battery mounted on the vehicle body, wherein a concave portion that is open in a longitudinal direction is formed at an upper surface of the counter weight, the battery is mounted on a position above a rear wheel of the vehicle body while at least a part of the battery overlaps with the counter weight, and the battery is removable toward a rear of the vehicle body through the concave portion of the counter weight.

According to the present invention, the battery-powered forklift, further comprises: a top panel supported at a position in which an upper area of a driver's seat is covered through a pair of rear stays extending upward from both sides of a posterior portion of the vehicle body, wherein a slit that is open in a longitudinal direction of the vehicle body is formed at a posterior end of the top panel.

According to the present invention, a battery passing region for removing the battery is formed by forming at least lower sides of the rear stays in parallel to each other and in line with a vertical direction viewed from the rear of the vehicle body.

According to the present invention, the rear stays are connected to corners of a posterior end of the top panel after changing extending directions of the rear stays at a portion above the battery passing region in order to approach each other.

According to the present invention, the rear stays are bent so that upper ends of the rear stays approach each other.

According to the present invention, the rear stays curve so that upper ends of the rear stays approach each other.

According to the present invention, in the rear stays, a distance between portions of which at least lower sides are formed in parallel to each other and in line with a vertical direction is larger than a width of the concave portion of the counter weight viewed from the rear of the vehicle body, and the distance between the portions does not overlap with the concave portion of the counter weight viewed from the rear of the vehicle body.

According to the present invention, the rear stays are fixed to the vehicle body in an anterior position to a front end surface of the counter weight.

According to the present invention, a battery hood capable of tilting toward a front of the vehicle body is provided on a position above the battery, and the driver's seat is placed at an upper surface of the battery hood, and the battery passing region is formed between the rear stays so that the battery hood and the driver's seat do not interfere with the rear stays when the battery hood is tilted forward.

Advantageous Effects of Invention

According to the present invention, the loading and unloading operation of the battery can be facilitated because a concave portion that is open in a longitudinal direction is formed on the upper surface of a counter weight so that the battery is removable toward the rear of the vehicle body through the concave portion of the counter weight. Further, the battery is mounted on the position above the rear wheel so that a battery that is as wide as the full width of the vehicle body can be applied. Thus, even when a battery having the same weight is mounted, the longitudinal dimension of the battery becomes short so that the battery can be placed at the further rear of the vehicle body. Thus, the battery can also be used as a balancing weight more effectively. As a result of these, the weight of the counter weight is drastically reduced, so that the weight of the vehicle body is reduced. This can save energy.

DESCRIPTION OF EMBODIMENTS

Hereinafter, preferred embodiments of the battery-powered forklift according to the present invention will be described in detail with reference to the accompanying drawings.

Figure 1:
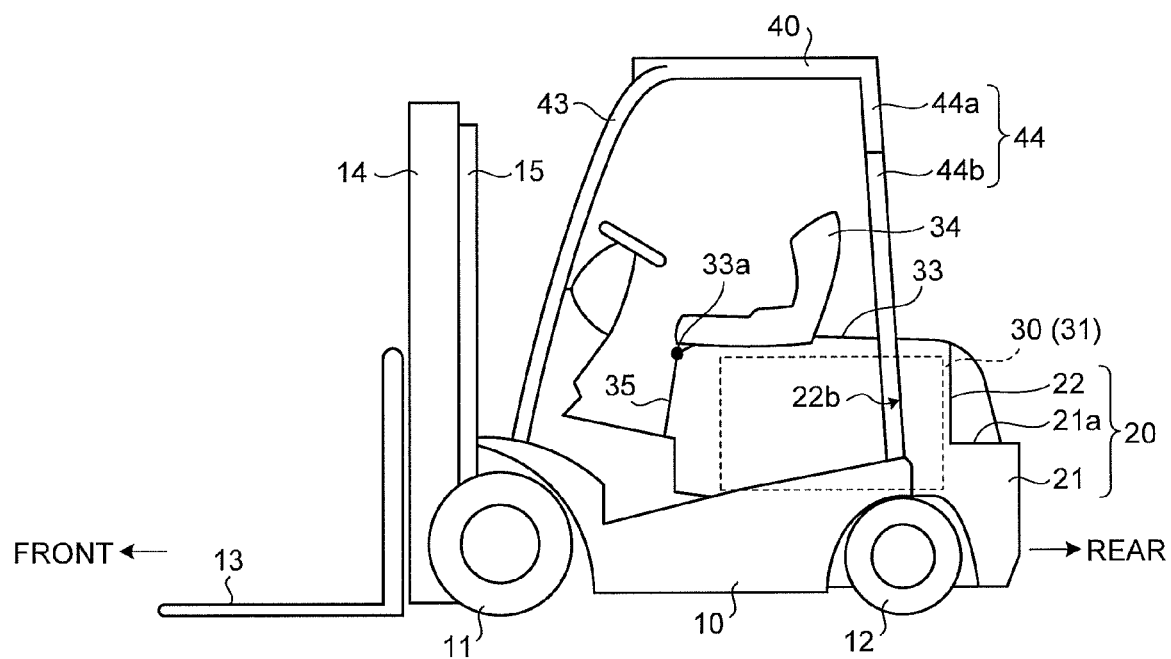
FIG. 1 is a side view of a battery-powered forklift that is a first embodiment of the present invention.
Figure 2:
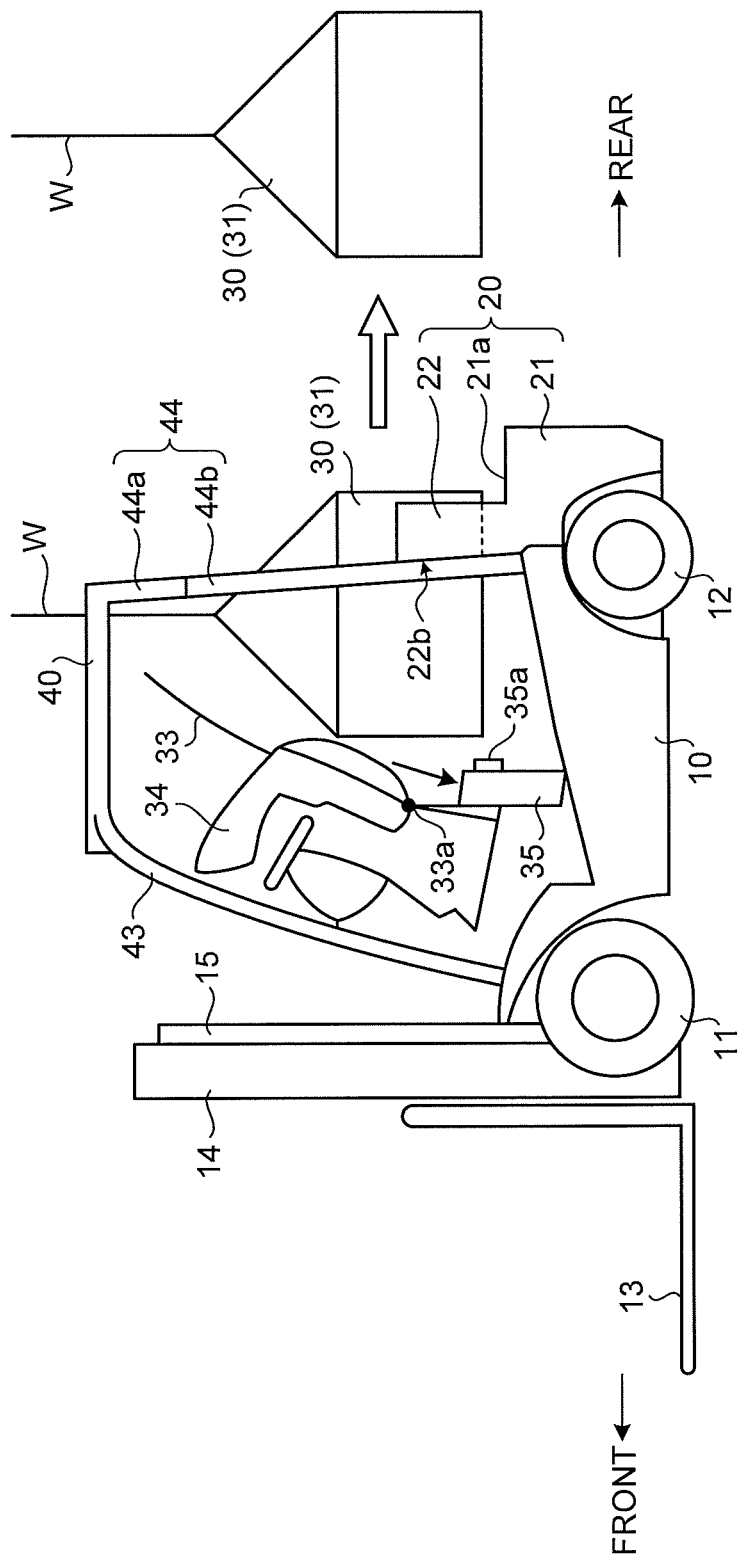
FIG. 2 is a side view of the battery-powered forklift illustrated in FIG. 1 when the loading or unloading operation of the battery is performed.
Figure 4:
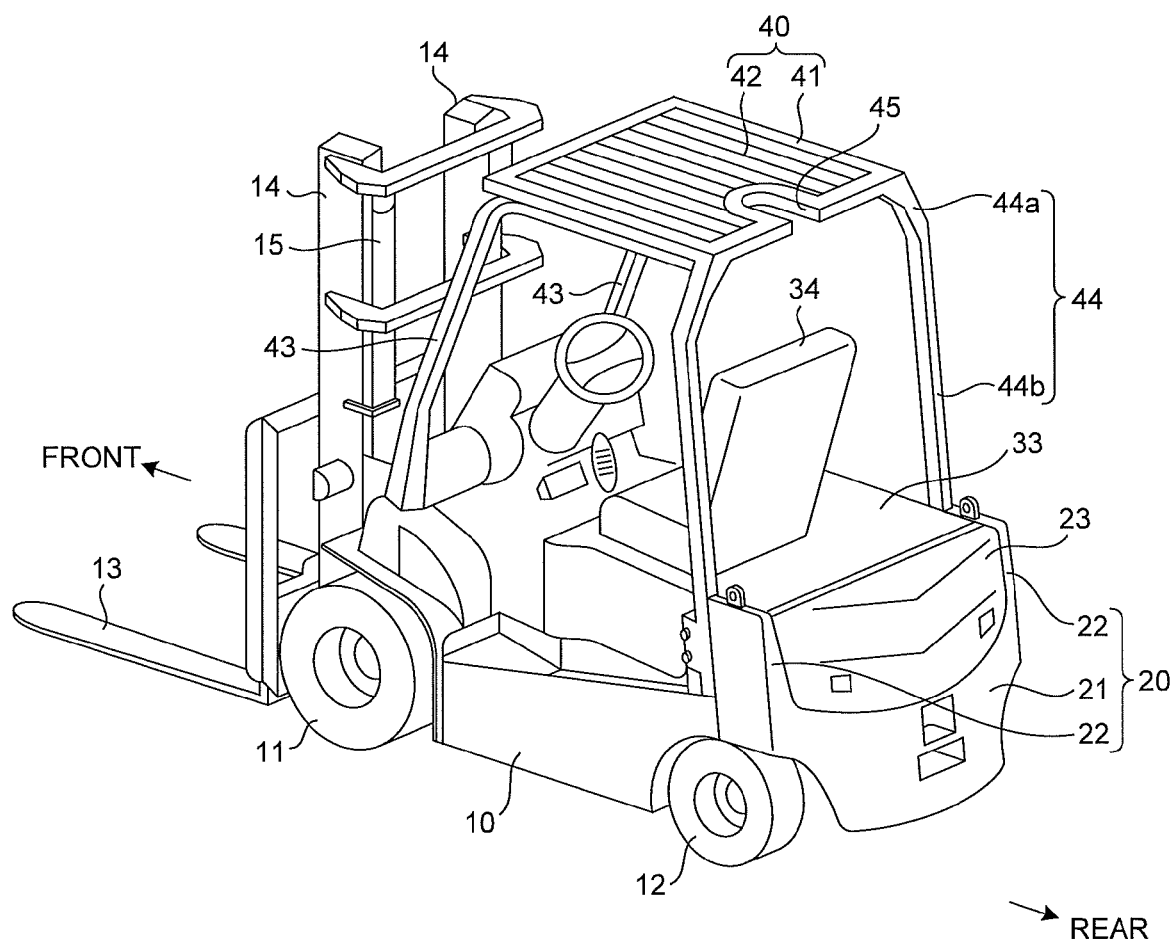
FIG. 4 is a rear perspective view of the battery-powered forklift illustrated in FIG. 1.

FIGS. 1, 2, and 4 illustrate a battery-powered forklift that is a first embodiment of the present invention. The battery-powered forklift exemplified herein includes a front wheel 11 at each of the corners of the anterior end of a vehicle body 10 and includes a rear wheel 12 at each of the corners of the posterior end of the vehicle body 10. The battery-powered forklift runs using the front wheels 11 as drive wheels by the drive of an electric motor (not illustrated in the drawings).

A fork 13 for loading, unloading, and moving a burden is provided at the anterior portion of the vehicle body 10. The fork 13 is supported by a mast 14 that is vertically provided. The fork 13 can move up and down along the mast 14 by the drive of a lift cylinder 15 that is provided between the fork 13 and the mast 14. Although not clearly illustrated in the drawings, the mast 14 is attached to the vehicle body 10 while the mast 14 can rotate around a horizontal shaft that is at the bottom end of the mast 14 in line with a horizontal direction. Further, the mast 14 includes a tilt cylinder (not illustrated in the drawings) between the mast 14 and the vehicle body 10 so that the mast 14 can have a head forward posture and a backward tilting posture relative to the vehicle body 10 by the drive of the tilt cylinder (not illustrated in the drawings).

Figure 3:
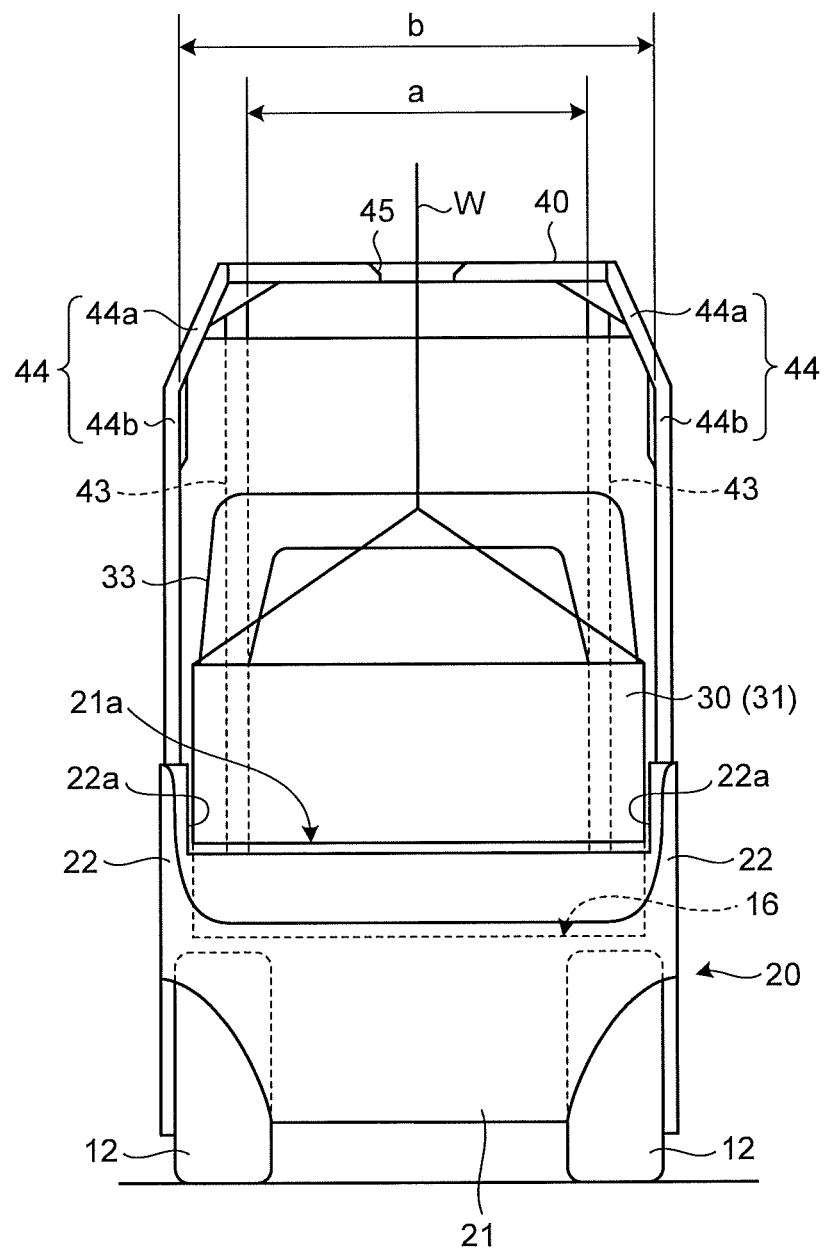
FIG. 3 is a rear view of the battery-powered forklift illustrated in FIG. 1 above which the battery is hoisted.

A counter weight 20 is provided at the posterior end of the vehicle body 10. The counter weight 20 is a metal weight for balancing when the fork 13 supports a burden. The counter weight 20 is placed from the portion above the rear wheel 12 to the portion at the posterior end of the rear wheel 12 at the vehicle body 10. As seen in FIG. 3, the counter weight 20 includes a concave portion that is open in a longitudinal direction on the upper surface. Concretely, a pair of columnar members 22 that projects upward is placed at both sides of a weight body 21 having a flat upper surface so that the counter weight 20 that has a concave portion on the upper surface is formed. The columnar members 22 are convex portions that project upward from the portions opposite each other at both sides of the weight body 21 and toward the front of the vehicle body 10 and that have guide surfaces 22a that are in parallel to each other in line with the longitudinal direction of the vehicle body 10. The columnar members 22 are integrated with the weight body 21. Note that the reference sign 23 illustrated in FIGS. 4 and 5 denotes a plastic weight cover that covers the posterior surface of the counter weight 20.

Figure 5:
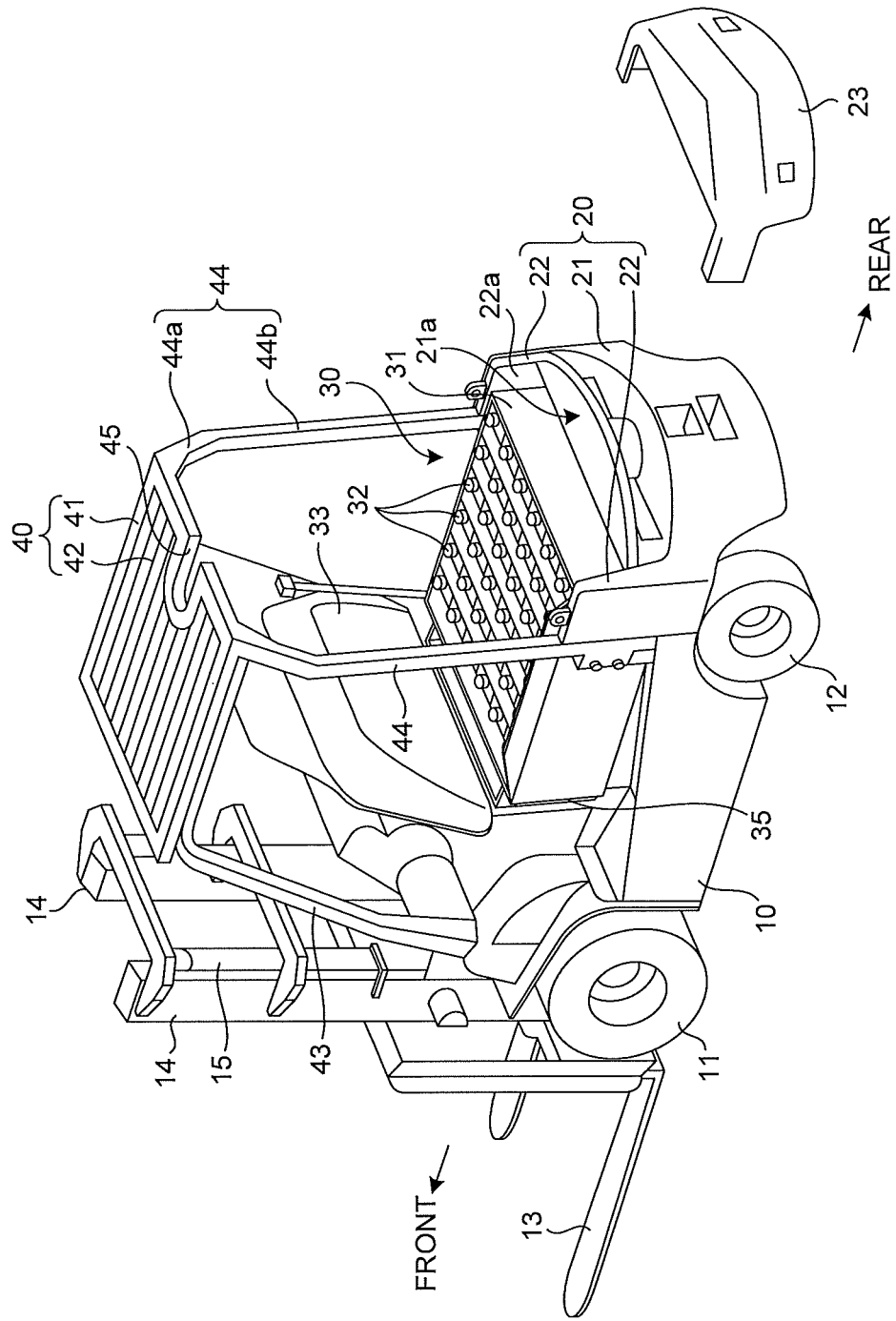
FIG. 5 is a rear perspective view of the battery-powered forklift illustrated in FIG. 1 on which a battery hood is tilted to expose the battery.

As illustrated in FIGS. 1, 2, and 5, a battery 30 that is power source is mounted on the center of the vehicle body 10. The battery 30 is formed by accommodating many battery cells 32 inside a battery case 31 in the shape of a rectangular parallelepiped of which upper surface is open. As illustrated in FIG. 3, the battery case 31 has the dimension along the horizontal direction of the vehicle body 10 that is set slightly smaller than the distance between the guide surfaces 22a formed at the columnar members 22 so that the battery case 31 can pass between the columnar members 22. As illustrated in FIGS. 1, 2, 5, and 7, in the vehicle body 10, the battery 30 is mounted at the front of the anterior surface of the weight body 21 and on a battery placing surface 16 (FIG. 7) positioned below an upper surface 21a of the weight body 21. The position of battery placing surface 16 is set so that the upper portion of the posterior end of the battery 30 is placed between the columnar members 22 and overlaps with the counter weight 20 when the battery 30 is mounted on the upper surface of the battery placing surface 16.

Figure 6:
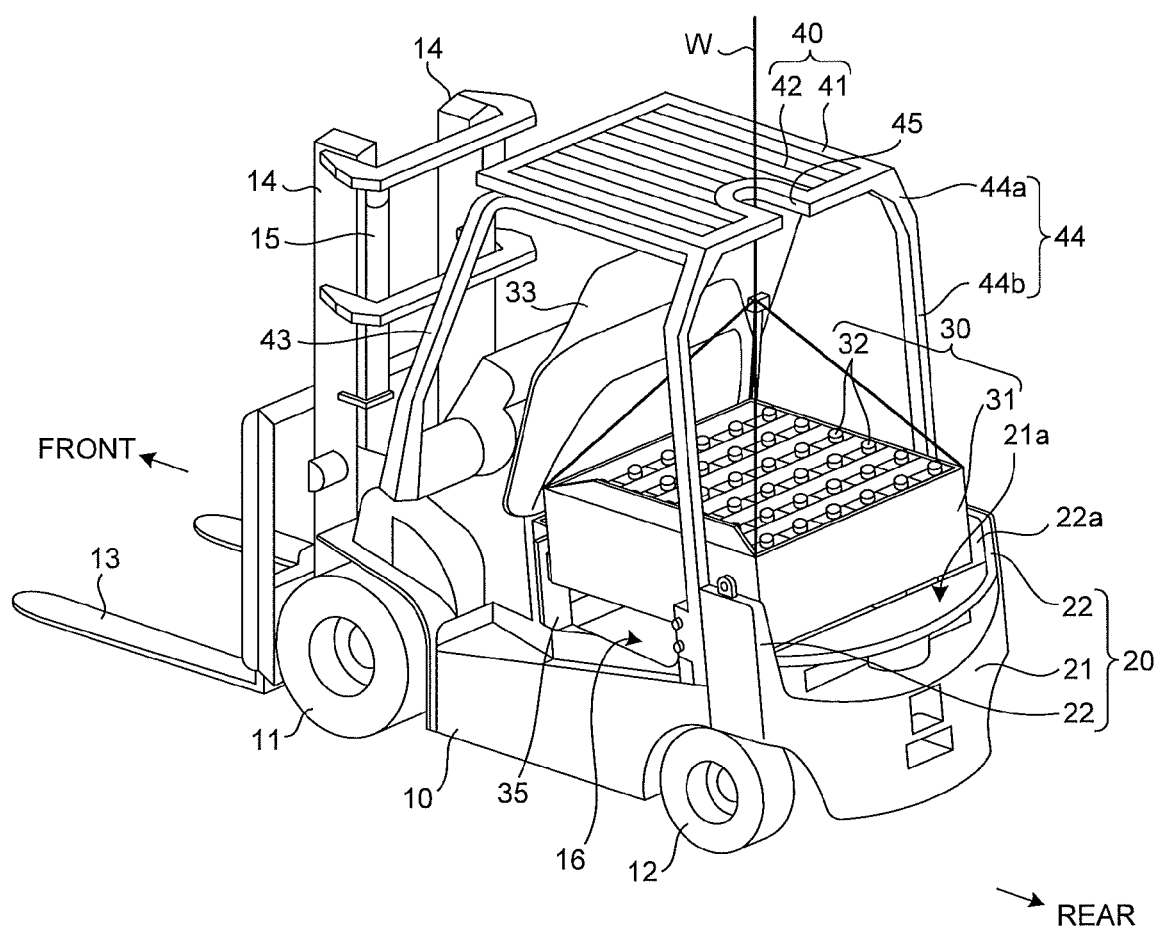
FIG. 6 is a rear perspective view of the battery-powered forklift illustrated in FIG. 1 above which the battery is hoisted.

A battery hood 33 is placed above the battery 30 mounted on the battery placing surface 16. Further, a driver's seat 34 is placed on the upper surface of the battery hood 33. The battery hood 33 has a size large enough to cover the upper surface of the battery case 31. The marginal part of the anterior end of the battery hood 33 is supported by a support bracket 35 of the vehicle body 10 through a support shaft 33a that is in line with the horizontal direction of the vehicle body 10 while the battery hood 33 can tilt. Rotating the battery hood 33 around the shaft center of the support shaft 33a can move the battery hood 33 between the horizontal position in which the upper side of the battery 30 is covered as illustrated in FIG. 1 and the head forward position in which the margin of the posterior end of the battery hood 33 is flipped up in order to open the upper area of the battery 30 as illustrated in FIG. 2. As illustrated in FIGS. 2 and 6, when the battery hood 33 is moved to the head forward position, the battery 30 can be levitated to the position high enough to make the bottom surface of the battery case 31 slightly upper than the upper surface 21a of the weight body 21 (hereinafter, referred to as a "battery moving and loading position") without the occurrence of the mutual interference between the battery hood 33 and the battery case 31.

Figure 7:
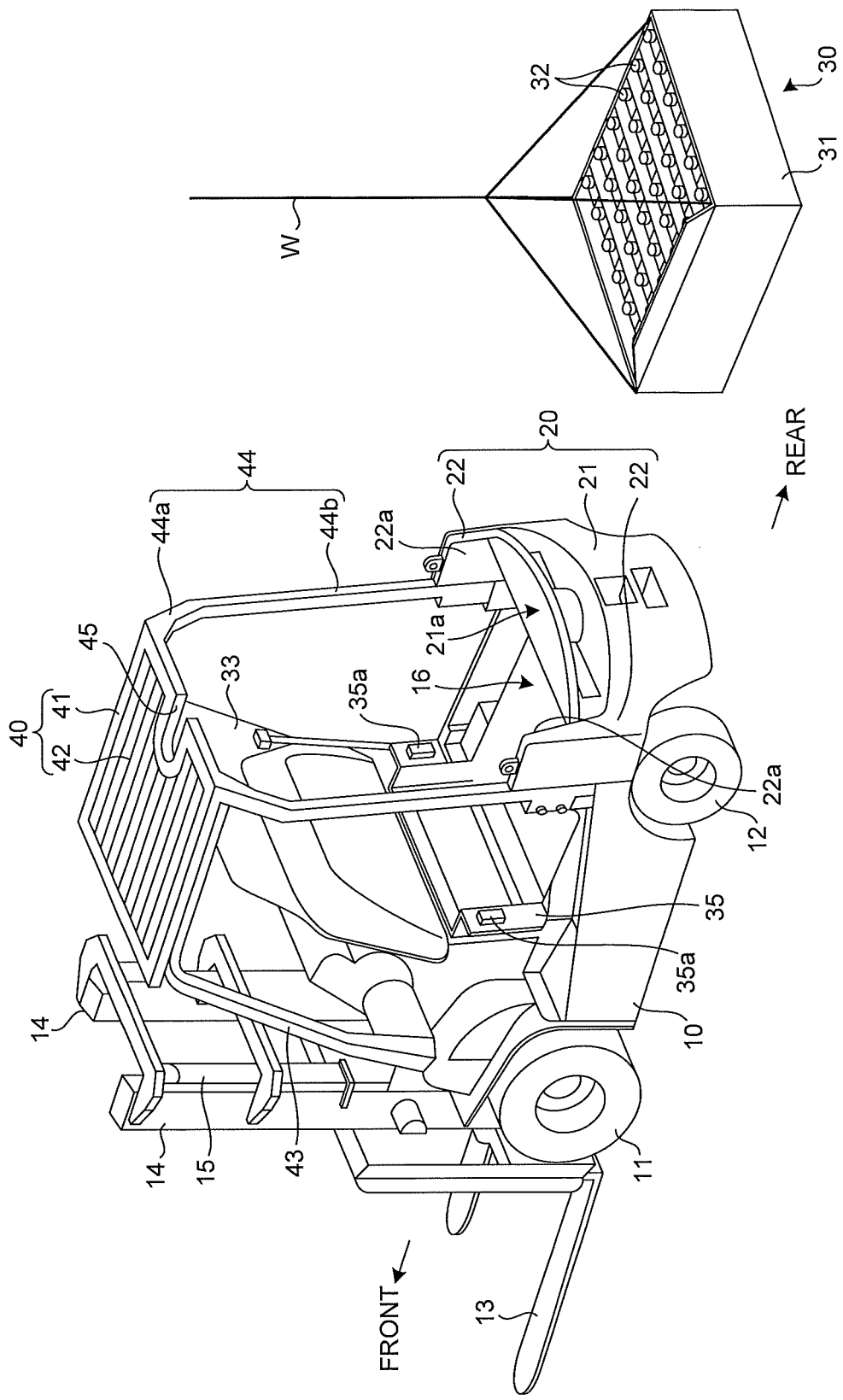
FIG. 7 is a rear perspective view of the battery-powered forklift illustrated in FIG. 1 when the battery is removed to the rear of the vehicle body.

As illustrated in FIGS. 2, 6 and 7, the support bracket 35 that supports the battery hood 33 stands upward from the portion positioned at the anterior end of the battery placing surface 16. A cushion material 35a is provided on a surface of the support bracket 35 that is positioned at the posterior side of the vehicle body 10. The cushion material 35a is formed into a rectangular parallelepiped shape with a material having great elasticity such as rubber and is attached while the long side is in a vertical direction. The cushion material 35a is placed while the long side is in a vertical direction so that the cushion material 35a can abut the upper portion of the anterior surface of the battery case 31 when the battery 30 is mounted on the battery placing surface 16, and can also abut the anterior surface of the battery case 31 when the battery 30 is levitated to the battery moving and loading position.

On the other hand, a top panel 40 is provided at the upper area of the vehicle body 10 as illustrated in FIGS. 1 to 4. The top panel 40 is formed by placing a plurality of rails 42 in a frame body 41 having an approximately rectangular shape and having a size large enough to cover the upper area of the driver's seat 34. The dimension along the horizontal direction of the vehicle body 10 is set smaller than the vehicle body 10. The top panel 40 is attached to the vehicle body 10 through a pair of front stays 43 and a pair of rear stays 44.

As illustrated in FIGS. 1 and 3, the front stays 43 extend downward from the corners of the anterior end of the top panel 40 and incline forward. The lower end of each of the front stays 43 is fixed at the anterior end of the vehicle body 10. The distance between the front stays 43 (the reference sign a illustrated in FIG. 3) is approximately constant along the whole length of the front stays 43.

On the other hand, each of the rear stays 44 includes a stay body 44b and a spreading portion 44a. The stay bodies 44b extend upward from both sides of posterior portion of the vehicle body 10 in parallel to each other in an approximately vertical direction. The spreading portions 44a are connected to the corners of the posterior end of the top panel 40 after changing the extending directions at the upper ends of the stay bodies 44b in order to upward and gradually approach each other. The distance between the stay bodies 44b positioned in parallel to each other at the rear stays 44 (the reference sign b illustrated in FIG. 3) is larger than the width of the concave portion of the counter weight 20 or, in other words, is larger than the distance between the guide surfaces 22a provided at the columnar members 22. Further, in the view from the rear of the vehicle body 10, the distance between the stay bodies 44b are formed in order not to overlap with the distance between the columnar members 22. Thus, the battery case 31 and the battery hood 33 can pass between the stay bodies 44b (battery passing region). The position of the section between the stay body 44b and the spreading portion 44a is set as high as possible so that the battery hood 33 does not interfere with the rear stays 44 when the battery hood 33 is moved from the horizontal position to the head forward position, and so that the rear stays 44 does not interfere with the battery case 31 when the battery 30 is placed at the battery moving and loading position. The stay body 44b is fixed to the vehicle body 10 at the position at the front of the anterior end surface of the counter weight 20 (an anterior end surface 22b of the columnar member).

As illustrated in FIG. 5, a slit 45 is formed at the top panel 40. The slit 45 is formed forward from the posterior end of the top panel 40 along the longitudinal direction of the vehicle body 10. The anterior end of the slit 45 is positioned at the front of the midpoint of the longitudinal dimension of the battery 30.

The battery-powered forklift having a structure as described above covers the battery 30 mounted on the battery placing surface 16 with the battery hood 33 and covers the posterior surface of the counter weight 20 with the weight cover 23, and then is provided for a cargo handling operation. In other words, by the operation of the operator sitting on the driver's seat 34, the battery-powered forklift can run by the electric motor (not shown in the drawings) through the front wheels 11 and the rear wheels 12 and can perform a desired cargo handling operation while properly moving up and down the fork 13.

Here, according to the above-mentioned battery-powered forklift, a part of the battery 30 is mounted on the vehicle body 10 while being positioned at the rear beyond the rear stays 44 that supports the top panel 40 and overlapping with the counter weight 20. Accordingly, the weight of the battery 30 effectively functions as a balancing weight so that the vehicle body 10 can be formed while the weight of the counter weight 20 is drastically reduced. This saves energy, for example, by reducing the weight of the vehicle body 10, and reducing the power consumption of the battery 30.

Further, the battery 30 is mounted on the position above the rear wheel 12 so that the horizontal dimension of the battery 30 can be secured largely. Accordingly, even when a battery 30 having the same weight is mounted, the longitudinal dimension of the battery 30 becomes short so that the battery 30 can be placed at the further rear of the vehicle body 10. Thus, the battery 30 is also used as a balancing weight more effectively.

Further, the concave portion through which the battery case 31 can longitudinally pass is formed on the upper surface of the counter weight 20. Further, the distance between the rear stays 44 supporting the top panel 40 is formed long enough to have a dimension through which the battery case 31 can pass.

Further, the slit 45 is formed at the top panel 40 while longitudinally extending and being open to the posterior end of the top panel 40. Thus, removing the weight cover 23 and moving the battery hood 33 to the head forward position as illustrated in FIG. 5, and then hoisting the battery 30 with a wire W as illustrated in FIG. 6 can levitate the battery 30 to the battery moving and loading position. Continuously moving the battery 30 backward in parallel can remove the battery 30 from the rear of the vehicle body 10 and unload the battery 30 as illustrated in FIG. 7. To load the battery 30 on the vehicle body 10, the reverse operation merely have to be performed.

During the operations, the rear stays 44 placed at the sides of the vehicle body 10 do not interrupt the motion of the battery 30 in the longitudinal direction of the vehicle body 10 and an incidental work such as attachment and removal of the rear stays 44 does not arise. Thus, there is not a risk of loss of workability when the battery 30 is loaded or unloaded. Further, the distance between the stay bodies 44b placed in parallel to each other in the rear stays 44 is slightly larger than the distance between the guide surfaces 22a provided at the columnar members 22. Further, in the view from the rear of the vehicle body 10, the distance between the stay bodies 44b are formed in order not to overlap with the distance between the columnar members 22. Further, the stay bodies 44b of the rear stays 44 are fixed to the vehicle body 10 at the position at the front of the anterior end of the counter weight 20. Thus, there is not a risk of damage of the rear stays 44 when the battery 30 is loaded or unloaded.

Additionally, the counter weight 20 is provided with the columnar members 22 at both sides of the upper surface 21a of the weight body 21 so that the guide surface 22a formed at each of the columnar members 22 works as a guide when the battery 30 is moved in the longitudinal direction of the vehicle body 10. Thus, there is not a risk, for example, that the battery 30 in motion would wobble and collide with another part, and both of the battery 30 and the other part would be damaged.

Similarly, the support bracket 35 supporting the battery hood 33 is provided with the cushion material 35a. Thus, there is not a risk that both of the battery 30 and the support bracket 35 would seriously be damaged even if the force developed when the battery 30 is loaded causes the battery case 31 to collide with the support bracket 35.

As described above, according to the above-mentioned the battery-powered forklift, after the battery 30 is hoisted from the position on which the battery 30 has been mounted in the vehicle body 10, the battery 30 can pass above the counter weight 20 and can be removed from the posterior side of the vehicle body 10. This can facilitate the loading and unloading operation of the battery 30.

Figure 8:
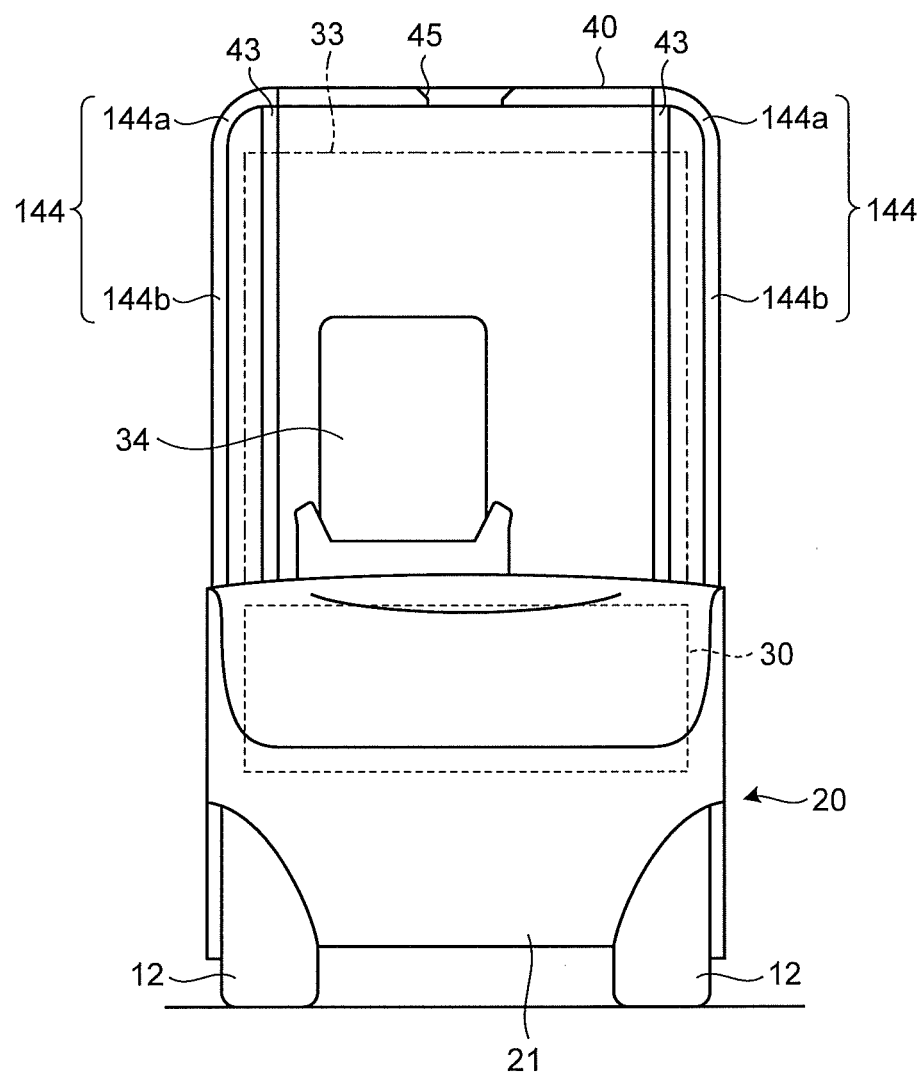
FIG. 8 is a rear view of a battery-powered forklift that is a second embodiment of the present invention.

Note that the present invention is not limited to the above-mentioned first embodiment although the spreading portions 44a that linearly and laterally project from the upper end of the rear stays 44 while downward and gradually moving apart from each other are provided in the first embodiment. For example, spreading portions 144a are provided in an second embodiment illustrated in FIG. 8. The spreading portions 144a are formed by the upper ends of rear stays 144 that curb in order to approach each other gradually and upward. Even in the above-mentioned second embodiment, when the battery hood 33 is moved from the horizontal position to the head forward position, or when the battery 30 is moved in the longitudinal direction of the vehicle body 10, stay bodies 144b of the rear stays 144 do not restrict the motions and an incidental work such as attachment and removal of the rear stays 144 does not arise. Thus, there is not a risk of loss of workability when the battery 30 is loaded or unloaded.

Figure 9:
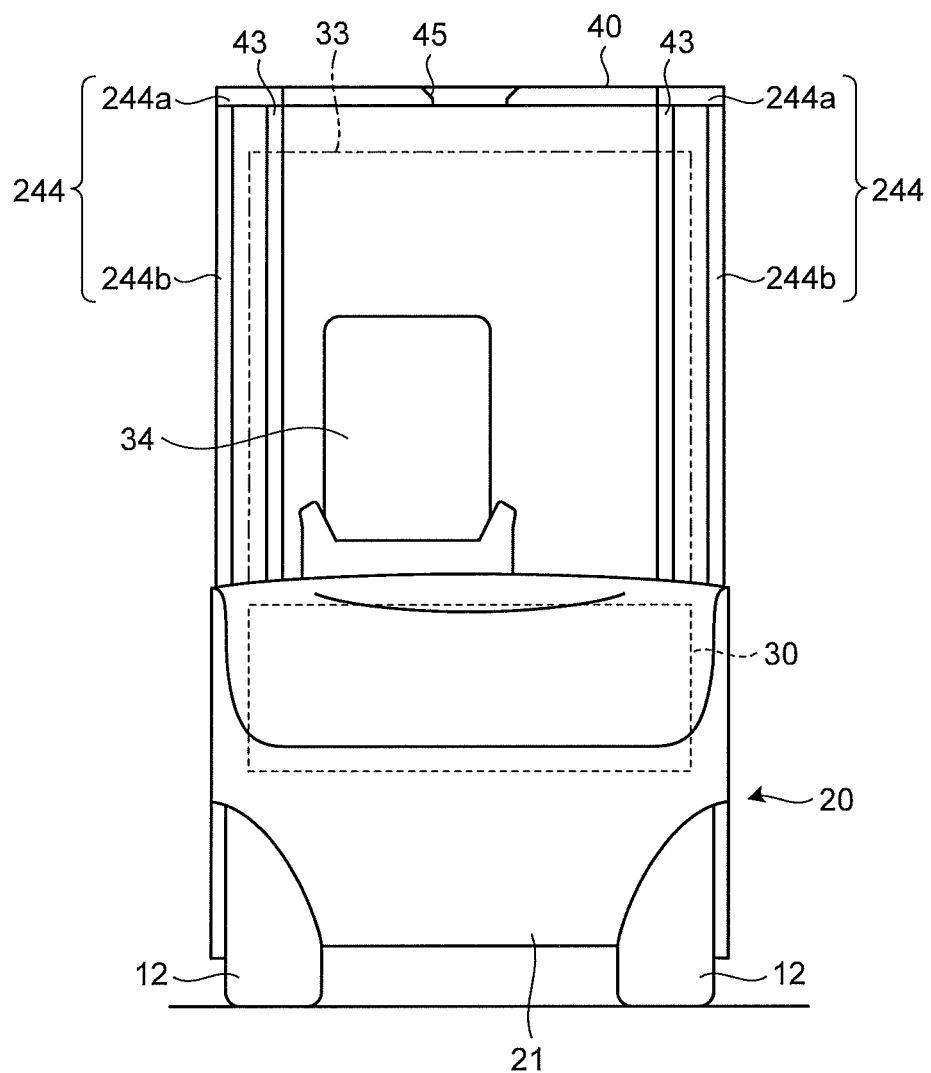
FIG. 9 is a rear view of a battery-powered forklift that is a third embodiment of the present invention.

Similarly, spreading portions 244a are provided at the upper ends of rear stays 244 while being bent in order to approach each other in a third embodiment illustrated in FIG. 9. Even in the above-mentioned third embodiment, when the battery hood 33 is moved from the horizontal position to the head forward position, or when the battery 30 is moved in the longitudinal direction of the vehicle body 10, stay bodies 244b of the rear stays 244 do not restrict the motions and an incidental work such as attachment and removal of the rear stays 244 does not arise. Thus, there is not a risk of loss of workability when the battery 30 is loaded or unloaded.

Note that, the same parts as the first embodiment in the second and third embodiments are denoted with the same reference signs and the detailed descriptions of the same parts are omitted.

Further, although the battery 30 that is formed by accommodating many battery cells 32 in a battery case 31 is shown as an example in each of the above-mentioned first to third embodiments, the structure of the battery is not limited to the embodiments.

REFERENCE SIGNS LIST

10 Vehicle body
12 Rear wheel
13 Fork
16 Battery placing surface
20 Counter weight
21 Weight body
21a Upper surface
22 Columnar member
22a Guide surface
30 Battery
33 Battery hood
34 Driver's seat
40 Top panel
44, 144, 244 Rear stay
45 Slit

The invention claimed is:

1. A battery-powered forklift comprising a fork placed at an anterior portion of a vehicle body, and a counter weight placed at a posterior portion of the vehicle body, the battery-powered forklift running by electric power of a battery mounted on the vehicle body,
   wherein a concave portion that is open in a longitudinal direction is formed at an upper surface of the counter weight,
   the battery is mounted on a position above a rear wheel of the vehicle body while at least a part of the battery overlaps with the counter weight,
   the battery is mounted at a position overlapping a driver's seat in a vertical direction, and
   the battery is removable toward a rear of the vehicle body through the concave portion of the counter weight.

2. The battery-powered forklift according to claim 1, further comprising:
   a top panel supported at a position in which an upper area of a driver's seat is covered through a pair of rear stays extending upward from both sides of a posterior portion of the vehicle body,
   wherein a slit that is open in a longitudinal direction of the vehicle body is formed at a posterior end of the top panel.

3. A battery-powered forklift comprising a fork placed at an anterior portion of a vehicle body, and a counter weight placed at a posterior portion of the vehicle body, the battery-powered forklift running by electric power of a battery mounted on the vehicle body,
   wherein a concave portion that is open in a longitudinal direction is formed at an upper surface of the counter weight,
   the battery is mounted on a position above a rear wheel of the vehicle body while at least a part of the battery overlaps with the counter weight,
   the battery is mounted at a position above a rear wheel of the vehicle body while at least a part of the battery overlaps with the counter weight, and
   the battery is removable toward a rear of the vehicle body through the concave portion of the counter weight,
   the battery-powered forklift, further comprising:
   a top panel supported at a position in which an upper area of a driver's seat is covered through a pair of rear stays extending upward from both sides of a posterior portion of the vehicle body,
   wherein a slit that is open in a longitudinal direction of the vehicle body is formed at a posterior end of the top panel, and
   a battery passing region for removing the battery is formed by forming at least lower sides of the rear stays in parallel to each other and in line with a vertical direction viewed from the rear of the vehicle body.

4. The battery-powered forklift according to claim 3, wherein the rear stays are connected to corners of a posterior end of the top panel after changing extending directions of the rear stays at a portion above the battery passing region in order to approach each other.

5. The battery-powered forklift according to claim 4, wherein the rear stays are bent so that upper ends of the rear stays approach each other.

6. The battery-powered forklift according to claim 4, wherein the rear stays curve so that upper ends of the rear stays approach each other.

7. A battery-powered forklift comprising a fork placed at an anterior portion of a vehicle body, and a counter weight placed at a posterior portion of the vehicle body, the battery-powered forklift running by electric power of a battery mounted on the vehicle body,
   wherein a concave portion that is open in a longitudinal direction is formed at an upper surface of the counter weight,
   the battery is mounted on a position above a rear wheel of the vehicle body while at least a part of the battery overlaps with the counter weight, and
   the battery is removable toward a rear of the vehicle body through the concave portion of the counter weight,
   the battery-powered forklift, further comprising:
   a top panel supported at a position in which an upper area of a driver's seat is covered through a pair of rear stays extending upward from both sides of a posterior portion of the vehicle body,
   wherein a slit that is open in a longitudinal direction of the vehicle body is formed at a posterior end of the top panel, and
   in the rear stays, a distance between portions of which at least lower sides are formed in parallel to each other and in line with a vertical direction is larger than a width of the concave portion of the counter weight viewed from the rear of the vehicle body, and the distance between the portions does not overlap with the concave portion of the counter weight viewed from the rear of the vehicle body.

8. The battery-powered forklift according to claim 7, wherein the rear stays are fixed to the vehicle body in an anterior position to a front end surface of the counter weight.

9. The battery-powered forklift according to claim 5, wherein a battery hood capable of tilting toward a front of the vehicle body is provided on a position above the battery, and the driver's seat is placed at an upper surface of the battery hood, and the battery passing region is formed between the rear stays so that the battery hood and the driver's seat do not interfere with the rear stays when the battery hood is tilted forward.

* * * * *